(12) United States Patent
Schendel et al.

(10) Patent No.: US 8,146,702 B2
(45) Date of Patent: Apr. 3, 2012

(54) LOAD HANDLING BUMPER FOR MATERIAL HANDLING DEVICE

(75) Inventors: David Lawrence Schendel, Farmington Hills, MI (US); Daniel T. Emond, West Bloomfield, MI (US); Gerald Edward Chilson, Alanson, MI (US); Wataru Kiyokawa, Fukui (JP)

(73) Assignee: Jervis B. Webb Company, Farmington Hills, MI (US)

( * ) Notice: Subject to any disclaimer, the term of this patent is extended or adjusted under 35 U.S.C. 154(b) by 355 days.

(21) Appl. No.: 12/556,882

(22) Filed: Sep. 10, 2009

(65) Prior Publication Data

US 2011/0056760 A1 Mar. 10, 2011

(51) Int. Cl.
*B60T 7/22* (2006.01)
(52) U.S. Cl. .......................................... 180/274; 701/23
(58) Field of Classification Search ................. 180/271, 180/274; 701/23; 280/47.34, 47.35
See application file for complete search history.

(56) References Cited

U.S. PATENT DOCUMENTS

| | | | |
|---|---|---|---|
| 3,664,701 A * | 5/1972 | Kondur | 293/4 |
| 3,901,346 A | 8/1975 | Kohls et al. | |
| 4,397,372 A | 8/1983 | De Kraker | |
| 4,802,548 A * | 2/1989 | Kausch | 180/274 |
| 4,987,540 A * | 1/1991 | Luke, Jr. | 701/24 |
| 5,023,790 A * | 6/1991 | Luke, Jr. | 701/24 |
| 5,048,637 A | 9/1991 | Lomasney | |
| 5,075,853 A | 12/1991 | Luke, Jr. | |
| 5,163,001 A * | 11/1992 | Luke, Jr. | 701/23 |
| 5,225,689 A * | 7/1993 | Buckle et al. | 250/559.4 |
| 5,386,364 A * | 1/1995 | Tyler | 701/23 |
| 5,403,143 A | 4/1995 | Ito | |
| 5,525,884 A | 6/1996 | Sugiura et al. | |
| 5,743,607 A | 4/1998 | Teufel et al. | |
| 5,961,559 A * | 10/1999 | Shimbara et al. | 701/23 |
| 6,129,025 A | 10/2000 | Minakami et al. | |
| 6,665,595 B1 | 12/2003 | Goto et al. | |
| 7,996,109 B2 * | 8/2011 | Zini et al. | 700/245 |
| 2005/0104390 A1 | 5/2005 | Norelius | |
| 2006/0051187 A1 | 3/2006 | Bell | |
| 2009/0030569 A1 * | 1/2009 | Thorne | 701/25 |
| 2009/0062974 A1 * | 3/2009 | Tamamoto et al. | 701/25 |

FOREIGN PATENT DOCUMENTS

EP 1 901 092 A2 3/2008

* cited by examiner

*Primary Examiner* — J. Allen Shriver, II
*Assistant Examiner* — James Triggs
(74) *Attorney, Agent, or Firm* — Dickinson Wright PLLC

(57) ABSTRACT

A material handling device includes an automated guided vehicle configured for use with a carrier. Both the vehicle and the carrier include a bumper having a reflective target mounted thereon. The automated guided vehicle includes a sensor having a light source and a scanner for receiving a reflection from the light source. The light source directs a first light beam at the vehicle reflective target and a second light beam at the carrier reflective target. When the vehicle bumper is moved toward the sensor, the vehicle reflective target moves into a reflective position and when the carrier bumper is moved toward the sensor, the carrier reflective target moves into a reflective position. The movement of the either bumper into the reflective position generates a signal from the sensor to a controller to control the movement of the automated guided vehicle in response to movement of either bumper.

28 Claims, 9 Drawing Sheets

LOAD HANDLING BUMPER FOR MATERIAL HANDLING DEVICE

BACKGROUND OF THE INVENTION

The use of safety bumpers in connection with automated guided vehicles is known to include electrical switches and flexible bumpers for use along with sensors. Automated guided vehicles can be provided with several different electrical devices used in combination with mechanical bumpers to detect an obstruction and stop the vehicle. Such devices have included known electrical switches activated by an operator upon an operator detection of an obstruction and also switches activated by a mechanical device moving in response to the detection of an obstruction.

Safety bumpers are also known for use on carriers attached to such automated guided vehicles. Such carriers can be configured to transport any number of different articles throughout a facility including, for example, hospitals and manufacturing facilities. Such carriers can be permanently fixed to the automated guided vehicle or releasably attached to an automated guided vehicle including, for example, by towing or lifting such carriers. However, all of the known carriers having safety bumpers are permanently attached to the automated guided vehicle along with all of the necessary electronics placed on-board the carrier including, switches, photoelectric scanners, light sources and, in many cases, a separate power unit to provide electricity to such electronics. It has been found that the cost of such carriers having on-board electronics is prohibitive. More specifically, in many cases, the cost of the carrier frame itself can be less than the cost of the required on-board electronics needed to operate the safety bumper. Further, the interchangeability of carriers having on-board electronics can be complex.

SUMMARY OF THE INVENTION

In view of the above, the present invention is directed to a material handling device having an automated guided vehicle configured for use with a carrier including a bumper on both the vehicle and the carrier. The vehicle bumper and the carrier bumper include a vehicle reflective target and a carrier reflective target, respectively. The automated guided vehicle includes a sensor having a light source and a scanner for receiving a reflection from the light source. The light source directs a first light beam at the vehicle reflective target and a second light beam at the carrier reflective target. The vehicle reflective target moves into a reflective position when the vehicle bumper is moved toward the sensor. The carrier reflective target moves into a reflective position when the carrier bumper is moved toward the sensor. A controller is provided for controlling the automated guided vehicle in response to a signal from the sensor.

In another embodiment, the carrier having the safety bumper as described above is arranged for driving under and out from under the automated guided vehicle. In one embodiment, the carrier bumper is mounted to the front and rear of the carrier and in another embodiment, the carrier includes a bumper on all four sides of such carrier.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
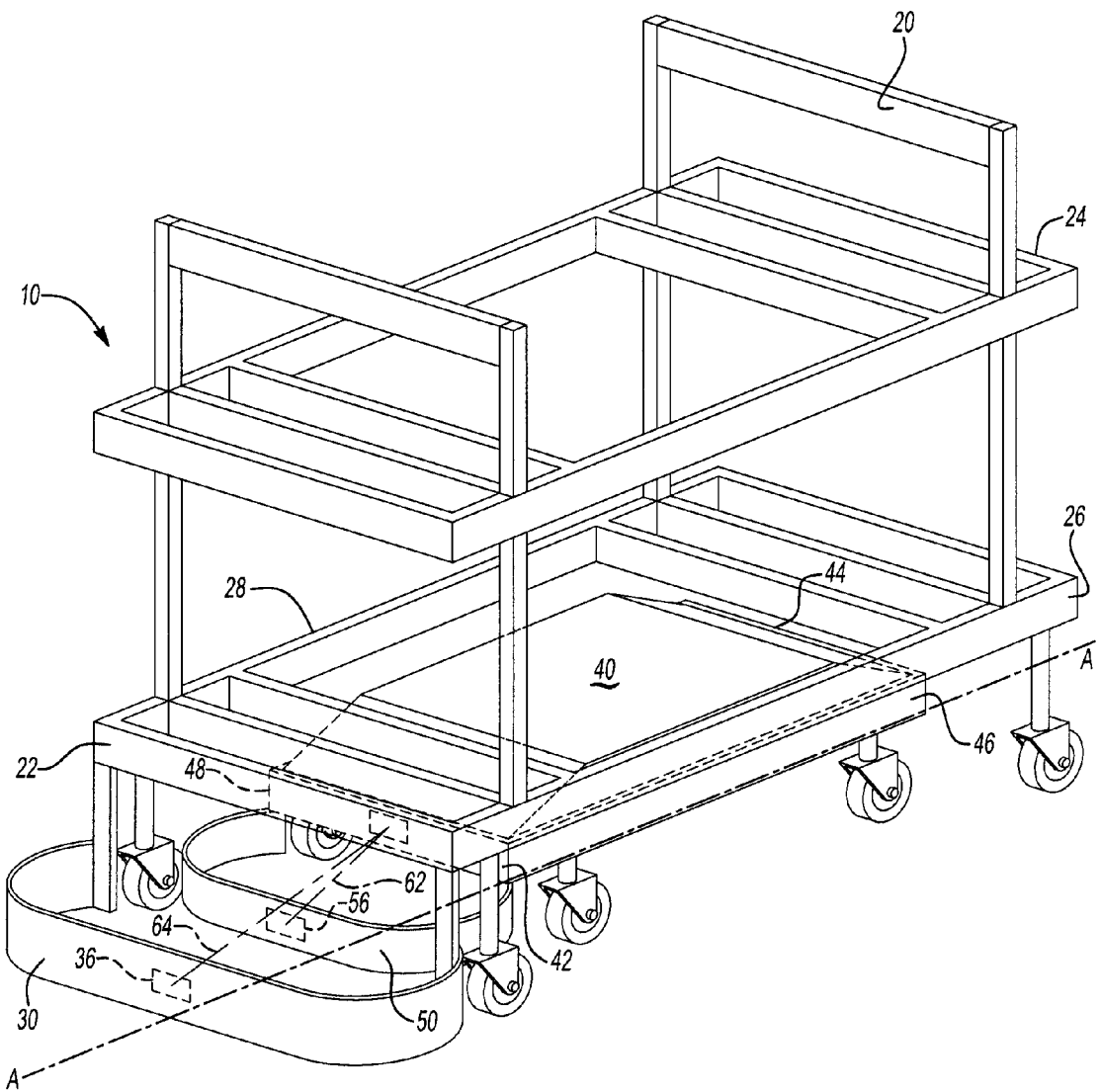
FIG. 1 is a perspective view of the subject material handling device.

A material handling device is generally shown at 10 in FIG. 1 having a carrier 20 attached to an automated guided vehicle 40. The carrier 20 has a front 22 and a rear 24, and first 26 and second 28 lateral sides. The carrier 20 is equipped with a carrier bumper 30 extending from the front 22 of the carrier 20. The automated guided vehicle 40 has a front 42 and a rear 44, and first 46 and second 48 lateral sides. The vehicle 40 is equipped with a vehicle bumper 50 extending from the front 42 of the vehicle 40. The carrier 20 can be fixedly or releasably attached to the vehicle 40 in any number of known methods for being automatically transported together along a path indicated at A as the material handling device 10. As discussed further herein, the carrier 20 can be provided in any number of configurations for carrying articles throughout a facility.

Figure 2:
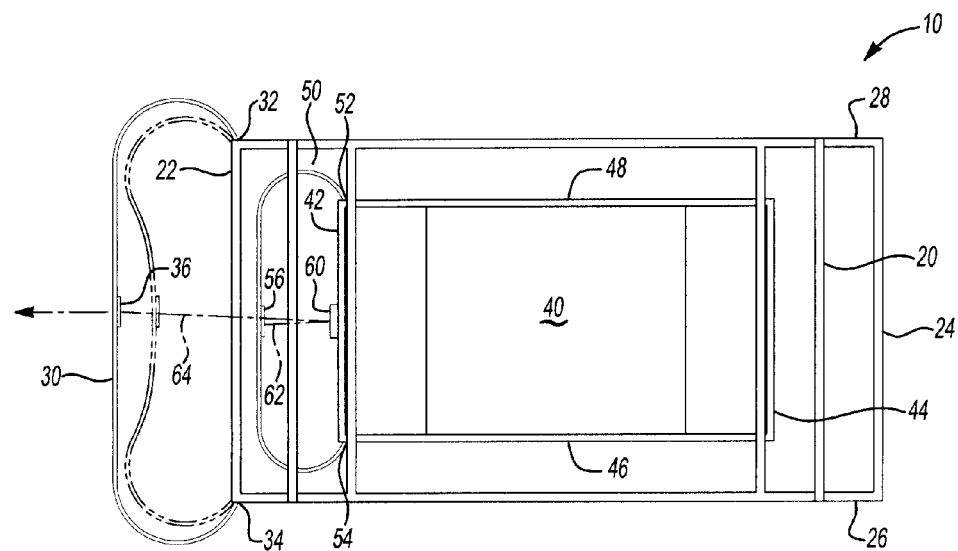
FIG. 2 is a plane view of the subject material handling device.
Figure 3:
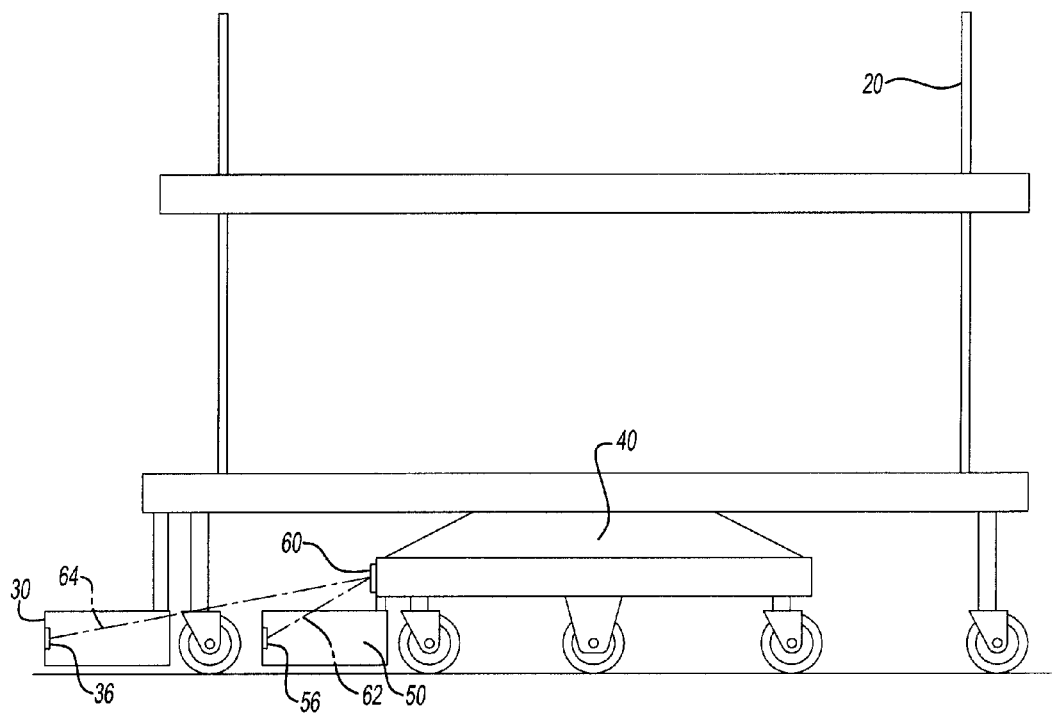
FIG. 3 is a side view of the subject material handling device.

With reference to FIGS. 2 and 3, the vehicle bumper 50 is formed of a flexible strip of material having ends 52 and 54 attached to the vehicle 40. Similarly, the carrier bumper 30 is formed of a flexible strip of material having ends 32 and 34 attached to the carrier 20. The flexible material for both of the bumpers 30 and 50 may be any known type of material which can be deflected in response to a load, such as sheet metal or a preformed composite material.

A vehicle reflective target 56 is secured to the rear surface of the vehicle bumper 50 facing the front 42 of the vehicle 40. Similarly, a carrier reflective target 36 is secured to the rear surface of the carrier bumper 30 also facing the front 42 of the vehicle 40. The material used for each reflective target can be a Scotchlite product of Minnesota Mining and Manufacturing Co. and may simply consist of a strip of tape, preferably a strip of high gain reflective tape, removably adhered to the rear surface of the bumpers 30 and 50. In addition, the material used for each reflective target can be a reflective tape product of Sick Optic Electronic or any other reflective target known in the art. This reflective material is capable of reflecting a beam of light received from a light source.

A sensor 60 is mounted on the front 42 of the vehicle 40 and includes a light source directing light through a semi-transparent mirror, a lens for creating a beam and a photoelectric scanner for receiving the beam after being reflected from the reflective targets 36 and 56. While any sensor known in the art may be used, a preferred sensor 60 is a photoelectric sensor made by Banner Engineering Corp. that detects a visible or invisible light source and responds to a change in the received light intensity of the light source. The light source is a light emitting diode (LED) light source, but may be any light source known in the art. The sensor 60 sends a beam of light indicated by line 62 toward the vehicle reflective target 56 and similarly, a second beam of light indicated by line 64 toward the carrier reflective target 36.

In the subject invention, the carrier 20 is provided only with the carrier bumper 30 having the carrier reflective target 36 without any need to mount, assemble, or attach any electronic devices to the carrier 20. In operation, the material handling device 10 uses the vehicle 40 to automatically move the carrier 20 around a facility carrying various articles for use in the facility along path A. Among other components, the automated guided vehicle 40 includes a driving motor, controller and a guidance system, as is well known in the industry. For example, such guidance systems may include the use of inertial guidance systems having a gyro. Since the automated guided vehicle 40 travels throughout the facility, it is possible that obstructions may arise in the path A of the material handling device 10 thereby requiring a manner of stopping the device 10 upon detection of the obstruction. When the device 10 is operating without running into any obstructions, the carrier reflective target 36 of the carrier bumper 30 is not in the beam of light 64 and as such, does not reflective the beam 64 back to the sensor 60. However, as best seen in FIG. 2, when the device 10 runs into an obstruction, the carrier reflective target 36 is deflected toward the front 42 of the vehicle 40 thereby causing the target 36 to encounter the beam of light 64 to reflect such beam 64 back to the sensor 60. The scanner of the sensor 60 receives the reflected beam 64 sending a signal to the controller of the vehicle 40 to cause the device 10 to stop. It has been found that a load of thirty pounds on the bumper 30 is best for causing the vehicle 40 to be stopped. Further, it has been found that an appropriate length of the bumper 30 is determined based on the weight of the load on the carrier 20, the speed of the vehicle 40 and the braking torque on the vehicle drive motor.

In addition, as seen in FIG. 2, the use of the sensor 60 on the vehicle 40 in connection with the carrier reflective target 36 may also be used to position the vehicle 40 with respect to the carrier 20. As further described below, in some cases, the vehicle 40 may be configured to drive under the carrier 40 for releasably mating therewith. In such operation, since the vehicle 40 includes the sensor 60 which is provided to send a signal to the controller of the vehicle 40 in response to a reflection of beam 64 from the carrier reflective target 36, it is also possible to use such signal to locate the vehicle 40 with respect to the carrier 20. The location of such carrier 20 to the vehicle 40 is needed to complete the connection therebetween.

Figure 4:
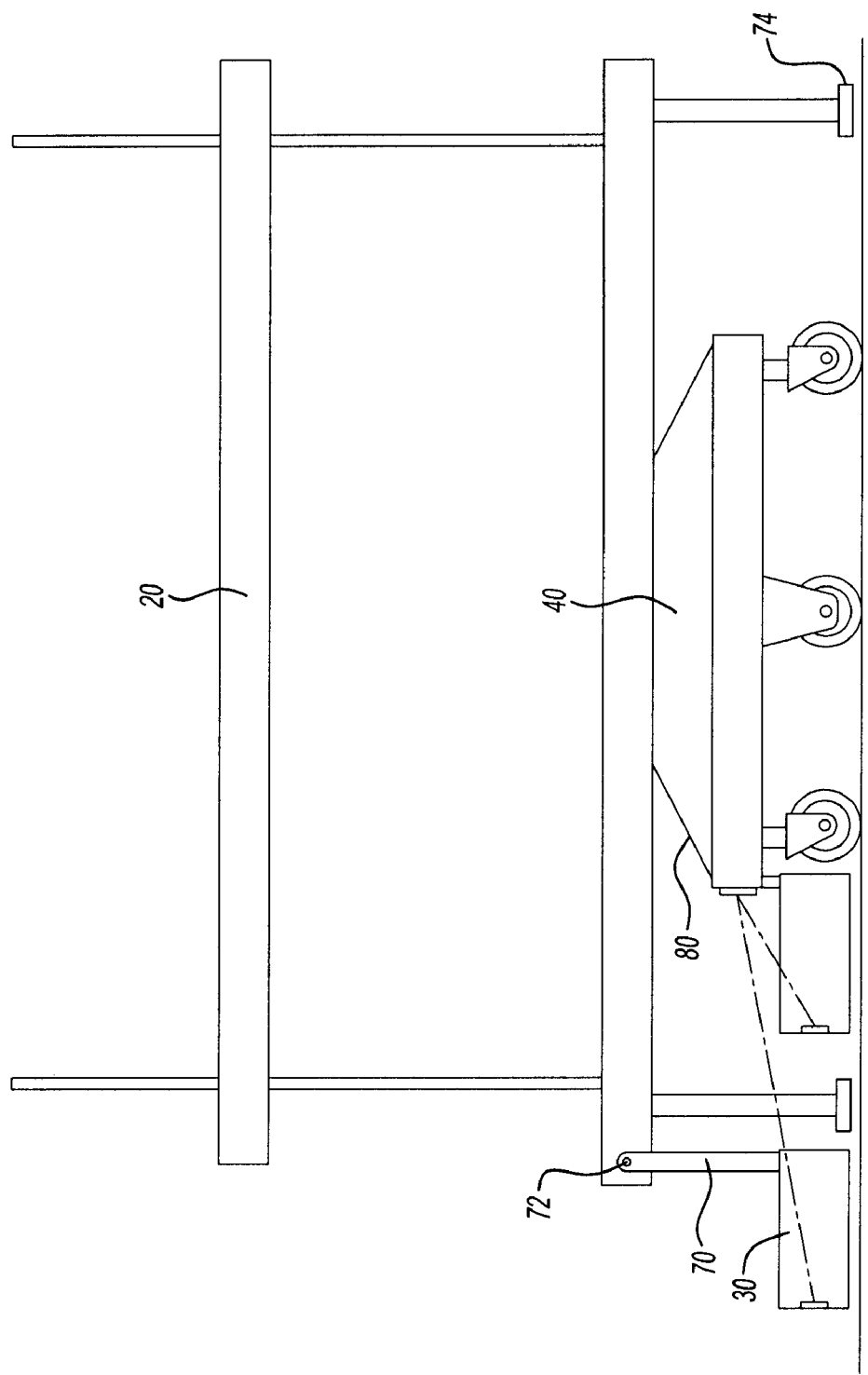
FIG. 4 is a side view of the subject material handling device having a pivotable bumper.
Figure 5:
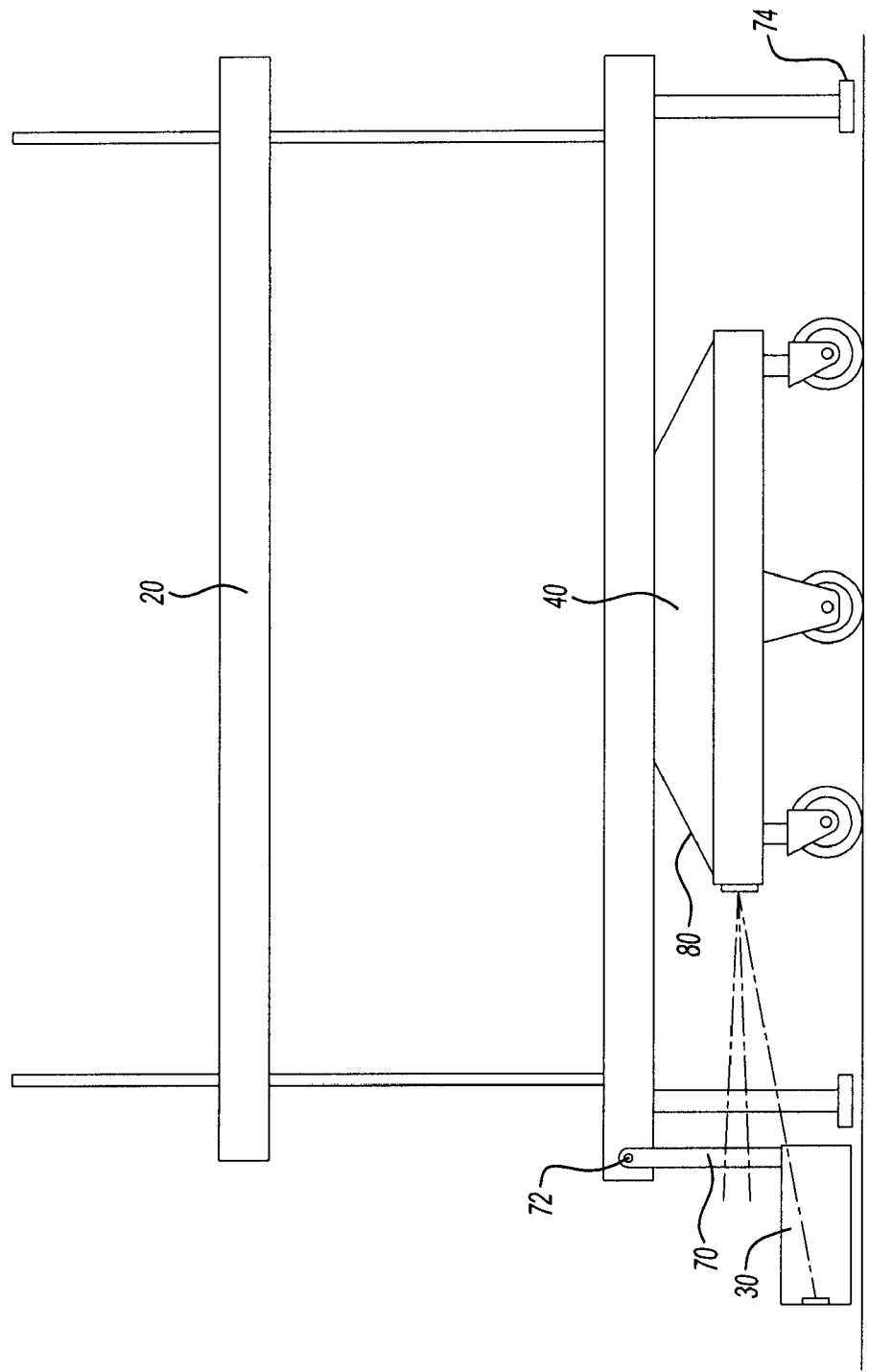
FIG. 5 is a side view of the subject material handling device having an electronic bumper.
Figure 6:
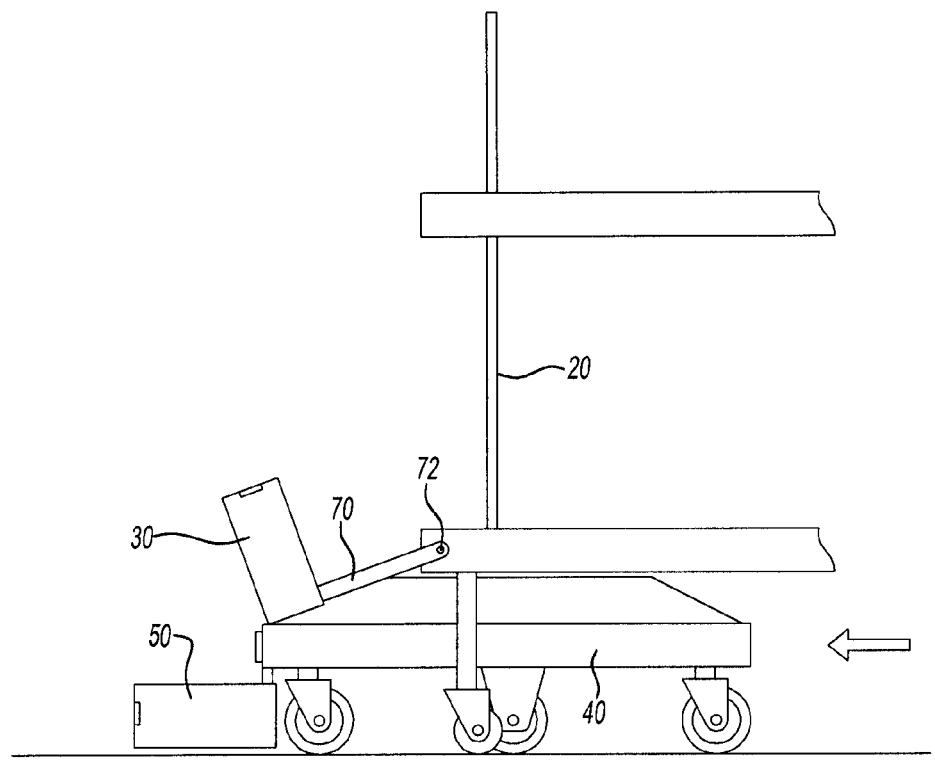
FIG. 6 is a partial side view showing an automated guided vehicle moving away from a carrier.
Figure 7:
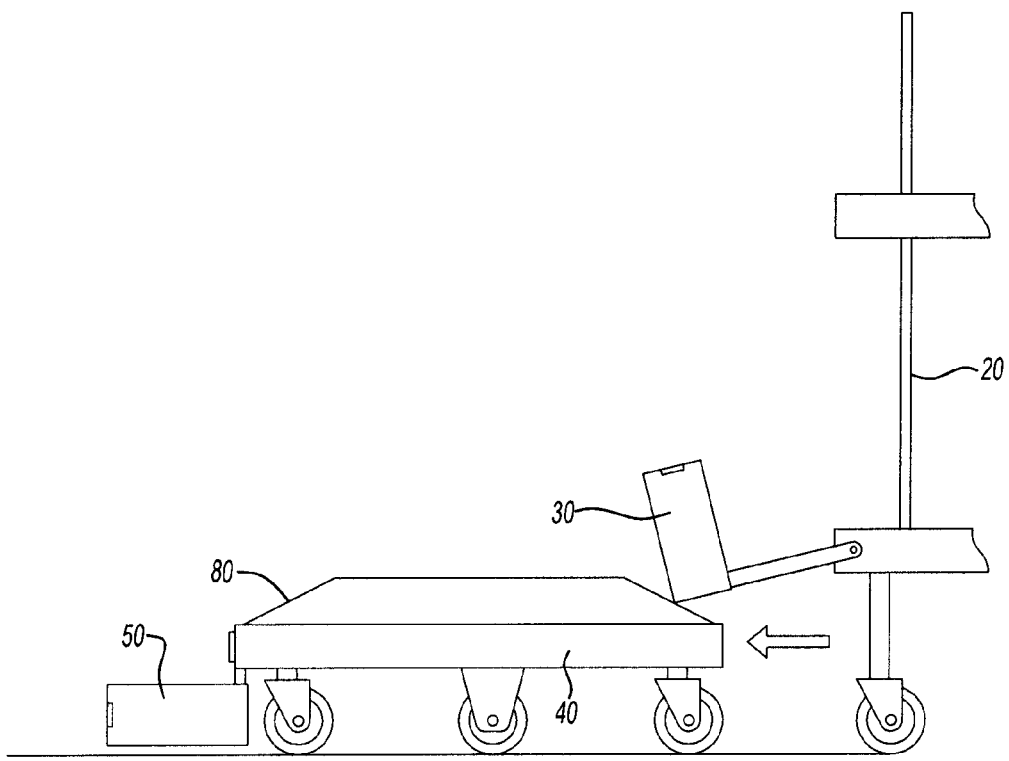
FIG. 7 is a partial side view showing an automated guided vehicle moving away from a carrier.

In another embodiment of the subject invention, as seen in FIGS. 4-6, the carrier bumper 30 of the carrier 20 may be pivotably mounted to the front 22 of the carrier 20, thereby permitting the vehicle 40 to operatively travel out from under the carrier 20 when no longer needed to transport such carrier 20. The carrier 20 is provided with a pair of pivot arms 70 for pivoting about a horizontal axis aligned with pivot pins 72. Similar to as described above, the carrier bumper 30 is formed of a flexible strip of material having ends 32 and 34 attached to the carrier 20. In this embodiment, the ends 32 and 34 of the carrier bumper 30 are attached to the pivot arms 70 which are pivotable mounted to the carrier 20. The operation of the carrier bumper 30 remains as described above. FIG. 4 also shows the carrier 20 having feet 74, without the use of wheels. It should be appreciated that many various carriers may be used for interaction with the vehicle 40 including whether such carriers are towed with wheels or lifted with feet 74. Also, FIG. 5 shows another embodiment of the subject invention wherein the vehicle 40 may also be provided with an electronic bumper on the front 42 of the vehicle 40. Such electronic bumper may be a laser or infra-red scanner providing object detection for the vehicle 40.

As shown in FIGS. 5 and 6, in operation, the controller associated with the vehicle 40 receives a signal to detach from the carrier 20. After the carrier 20 is detached from the vehicle 40, the controller is also programmed to set the photoelectric scanner associated with the carrier bumper 30 to the off setting so that the vehicle 40 is not inadvertently stopped by the beam 64 as the vehicle 40 travels out from underneath the carrier 20. When the vehicle 40 contacts the carrier bumper 30, the bumper 30 pivots clockwise about the pivot pin 72 to thereby clear the path of the vehicle 40 during exit of the vehicle 40 from under the carrier 20. As shown in FIGS. 3-7, the shape of the vehicle 40 must be configured to include at least one ramping surface 80 permitting the bumper 30 to pivot in response to the interference of the vehicle 40 without causing damage to the vehicle 40.

After exiting the carrier 20, the vehicle 40 is free to move about the facility along path A. In the event that an obstruction arises along path A while vehicle 40 is traveling thereon, the operation of the bumper 50 for the vehicle 40 is similar to as described above. When the vehicle 40 is operating without running into any obstructions, the vehicle reflective target 56 of the vehicle bumper 50 is not in the beam of light 62 and as such, does not reflect the beam 62 back to the sensor 60. However, when the vehicle 40 runs into an obstruction, the vehicle reflective target 56 is deflected toward the front 42 of the vehicle 40 thereby causing the target 56 to encounter the beam of light 62 to reflect such beam 62 back to the sensor 60. The scanner of the sensor 60 receives the reflected beam 62 sending a signal to the controller of the vehicle 40 to cause the vehicle 40 to stop.

Figure 8:
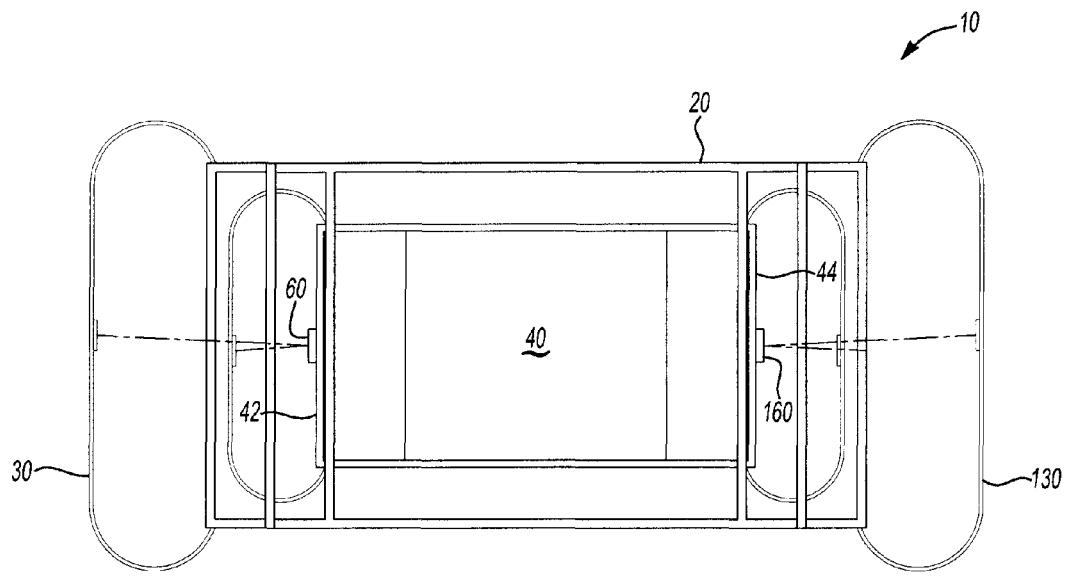
FIG. 8 is a plane view of another embodiment of the subject material handling device.

FIG. 8 shows the carrier 20 mounted to the vehicle 40 together as the material handling device 10 with the carrier 20 having two reflective bumpers 30 and 130. In this embodiment, the vehicle 40 includes two sensors 60 and 160 mounted on the front 42 and the rear 44 of the vehicle 40, respectively. In this embodiment, the vehicle 40 can detect obstructions which may be present in the path of travel from both the front 42 and rear 44 of the vehicle 40. Again, in this embodiment, the carrier 20 is provided only with the carrier bumper without any need for electronic devices on the carrier 20.

Figure 9:
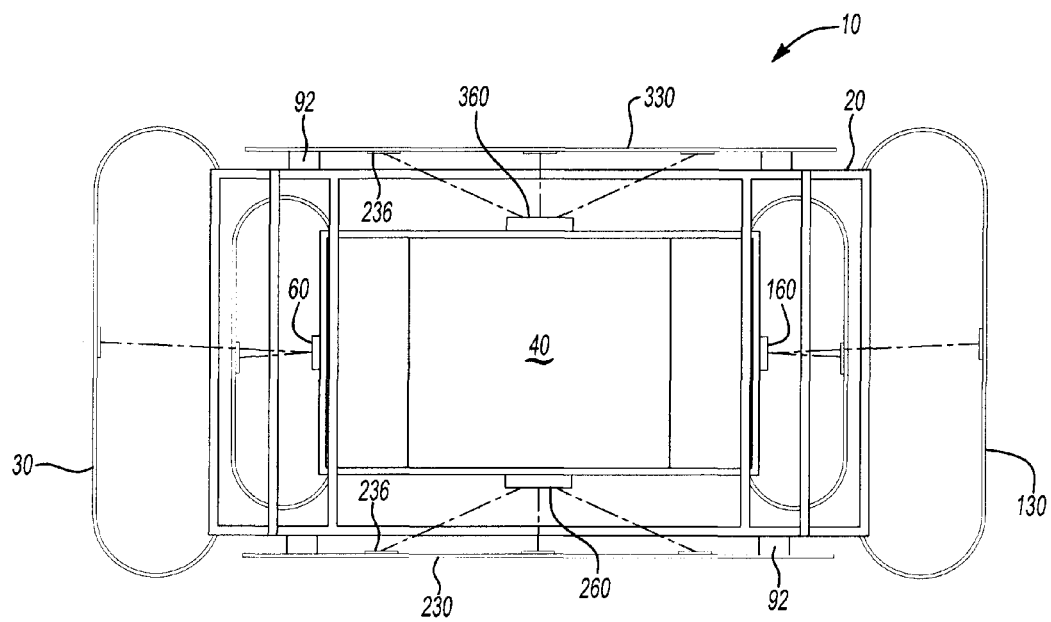
FIG. 9 is a plane view of another embodiment of the subject material handling device.
Figure 10:
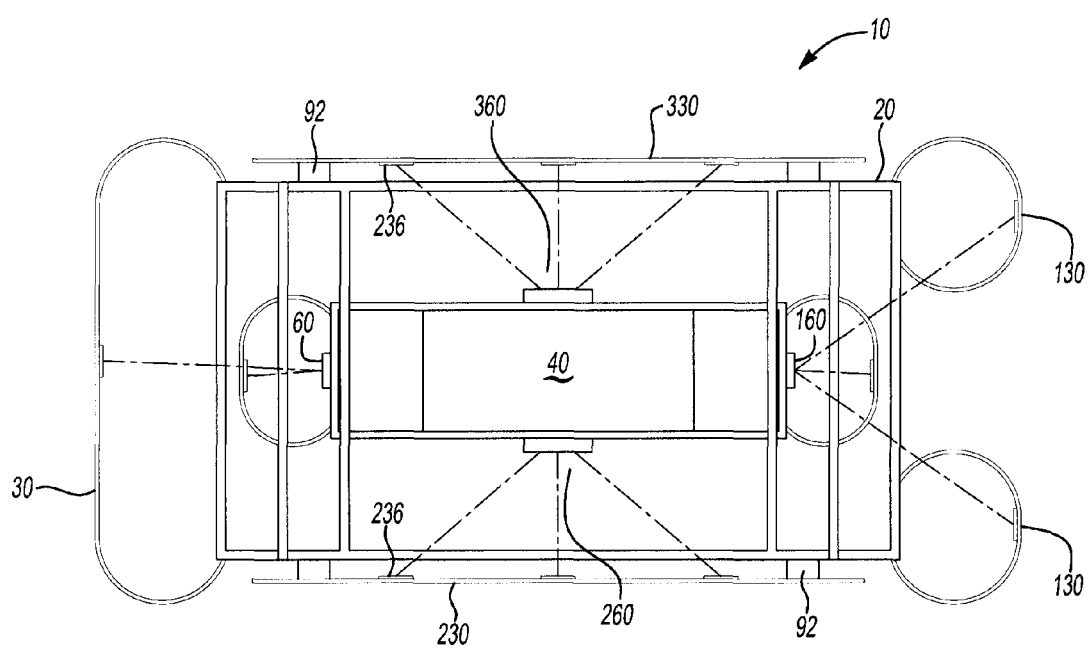
FIG. 10 is a plane view of another embodiment of the subject material handling device.
Figure 11:
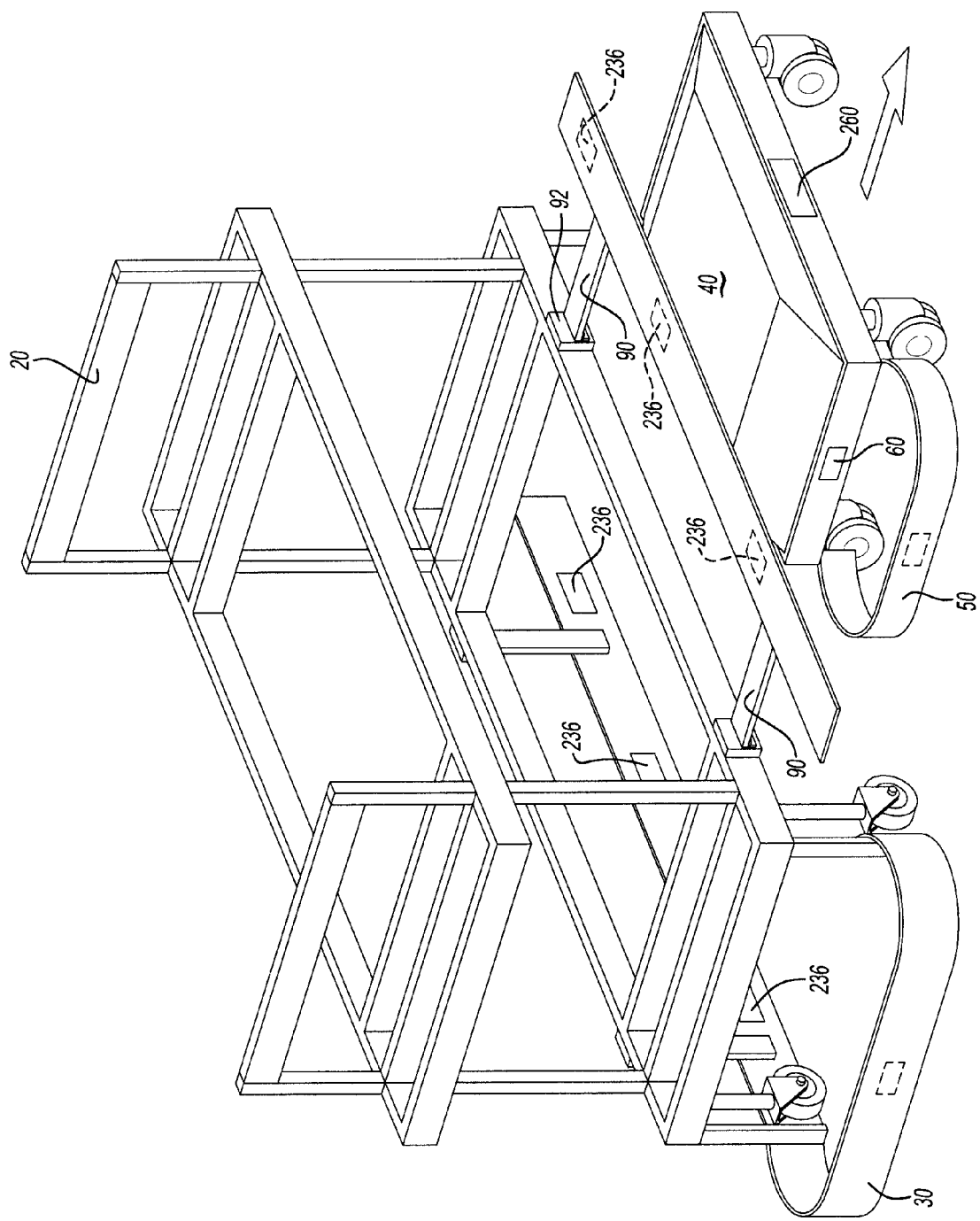
FIG. 11 is a perspective view of the subject material handling device.

In another embodiment of the subject invention, as shown in FIGS. 9-11, the material handling device 10 includes the carrier 20 having at least one bumper mounted on all four sides of the carrier 20. More specifically, the carrier 20 includes carrier reflective bumpers 30, 130, 230, 330 mounted on the front 22, rear 24, first 26 and second 28 sides of the carrier 20. The vehicle 40 includes four sensors 60, 160, 260, and 360 mounted on the front 42, rear 44, first 46 and second 48 sides of the vehicle 40. Sensors 60, 160, 260 and 360 are configured to operate as described above with carrier bumpers 30, 130, 230 and 330, respectively. FIG. 11 shows the rear bumper 130 configured as two pieces spaced a given distance to permit the vehicle 40 to travel under the carrier 20 entering in the space between each of the bumpers 130. Again, in this embodiment, the carrier 20 is provided only with the carrier bumper without any need for electronic devices on the carrier 20.

More specifically, FIG. 11 shows the carrier 20 having a pivoting carrier bumper 230 arranged with pivot arms 90 for pivoting about a horizontal axis aligned with pivots 92. In this embodiment, the vehicle 40 can be configured to move under and out-from-under the carrier 20 from one of said first and second lateral sides 26. The carrier bumper 230 includes carrier reflective targets 236 arranged at predetermined positions for reflecting a light beam sent by sensor 260 of the vehicle 40, as described above.

Figure 12:
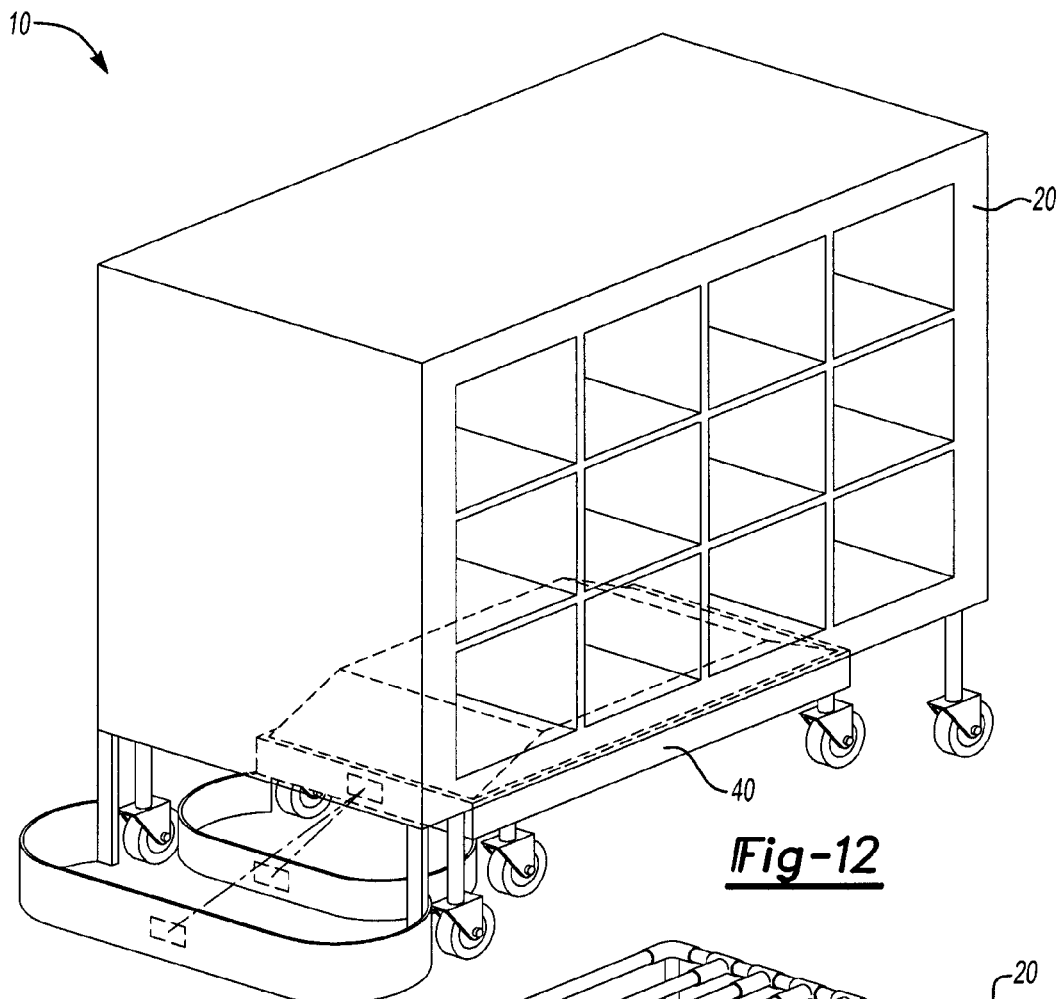
FIG. 12 is a perspective view of a carrier for use with the subject material handling device.
Figure 13:
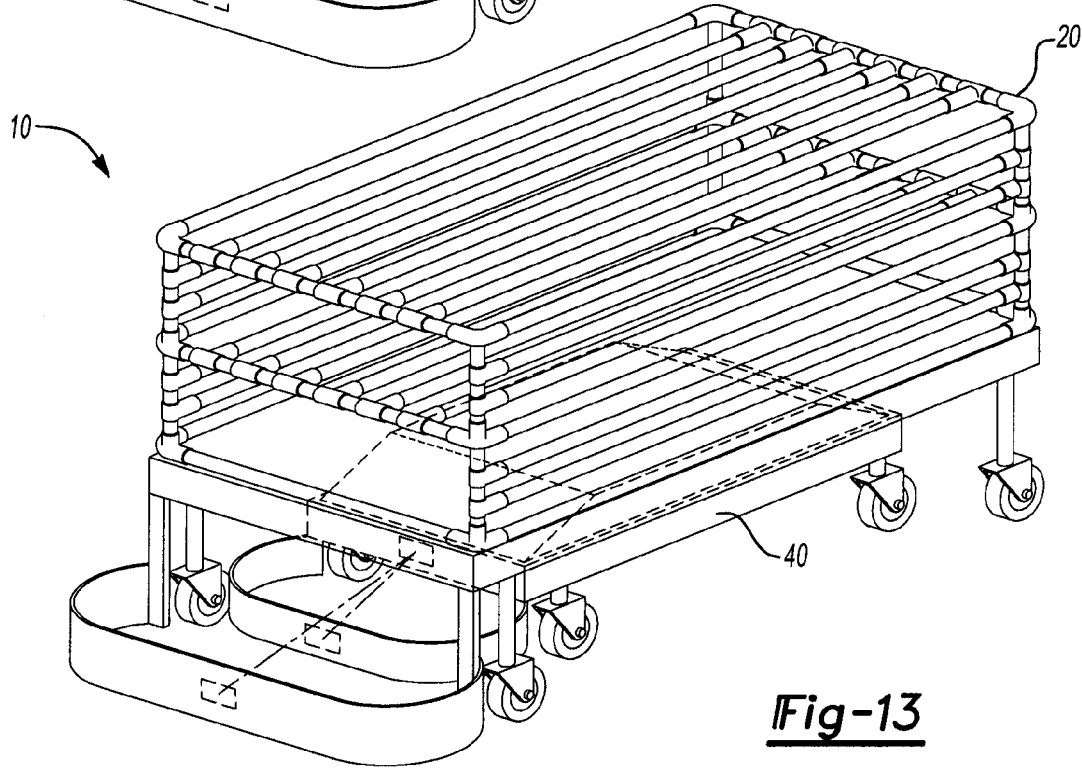
FIG. 13 is a perspective view of a carrier for use with the subject material handling device.

FIGS. 12 and 13 are provided to show various configurations of the carrier 20 for use with the vehicle 40. FIG. 12 shows a carrier 20 having cubicle storage bins for use with articles.

FIG. 13 shows a rack system having racked shelving formed of tubular portions for shelving articles. It should be appreciated that the type or shape of the carrier 20 described for use with the material handling device 10 is not limited and may include any number of various carrier types.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A material handling device having an automated guided vehicle configured for use with a carrier comprising:
    a vehicle bumper, mounted to the automated guided vehicle, including a vehicle reflective target secured to said bumper;
    a sensor, mounted on the automated guided vehicle, having a light source capable of transmitting a first and a second light beam and a scanner for receiving a reflection from said first and said second light beam;
    said first light beam directed toward the vehicle reflective target;
    said vehicle reflective target being moveable in response to deflection of said vehicle bumper from a non-reflective position to a reflective position when said vehicle bumper is moved toward said sensor;
    a carrier bumper, mounted to the carrier, including a carrier reflective target secured to said carrier bumper;
    said second light beam directed to the carrier reflective target;
    said carrier reflective target being moveable in response to deflection of said carrier bumper from a non-reflective position to a reflective position when said carrier bumper is moved toward said sensor; and
    a controller for controlling the automated guided vehicle in response to a signal from said sensor.

2. A material handling device according to claim 1 wherein said carrier bumper is mounted to a front portion of said carrier.

3. A material handling device according to claim 1 wherein said carrier bumper is pivotably mounted to at least one side of said carrier about a horizontal axis.

4. A material handling device according to claim 1 wherein said carrier bumper is mounted to at least two sides of said carrier.

5. A material handling device according to claim 3 wherein said carrier bumper is pivotably mounted to a front portion of said carrier.

6. A material handling device according to claim 3 wherein said carrier bumper is pivotably mounted to a lateral side of said carrier.

7. A material handling device according to claim 3 wherein the automated guided vehicle includes a ramp surface for contacting said carrier bumper.

8. A material handling device according to claim 1 wherein said carrier includes at least four carrier bumpers mounted to at least a portion of a front, rear and a first and second lateral side of said carrier.

9. A material handling device according to claim 1 wherein said light source includes a first and a second light source for sending said first and said second light beams, respectively.

10. A material handling device according to claim 1 wherein said scanner includes a first and a second scanner for receiving said reflection from said first and said second light beams, respectively.

11. A material handling device according to claim 1 wherein said carrier bumper includes at least two bumpers mounted in a predetermined spaced manner.

12. A material handling device comprising:
    a carrier having a front, rear and first and second lateral sides;
    an automated guided vehicle configured for driving under said carrier, engaging and disengaging said carrier at a predetermined position, and driving-out from under said carrier;
    a vehicle bumper, mounted on said automated guided vehicle, including a vehicle reflective target secured to said vehicle bumper;
    a sensor, mounted on the automated guided vehicle, having a light source capable of transmitting a first and a second light beam and a scanner for receiving a reflection from said first and said second light beam;
    said first light beam directed toward the vehicle reflective target;
    said vehicle reflective target being moveable in response to deflection of said vehicle bumper from a non-reflective position to a reflective position when said vehicle bumper is moved toward said sensor;
    a carrier bumper, mounted to the carrier, including a carrier reflective target secured to said carrier bumper;
    said second light beam directed to the carrier reflective target;
    said carrier reflective target being moveable in response to deflection of said carrier bumper from a non-reflective position to a reflective position when said carrier bumper is moved toward said sensor; and
    a controller for controlling the automated guided vehicle in response to a signal from said sensor.

13. A material handling device according to claim 12 wherein said carrier bumper is mounted to a front portion of said carrier.

14. A material handling device according to claim 12 wherein said carrier bumper is pivotably mounted to at least one side of said carrier about a horizontal axis.

15. A material handling device according to claim 12 wherein said carrier bumper is mounted to at least two sides of said carrier.

16. A material handling device according to claim 14 wherein said carrier bumper is pivotably mounted to a front of said carrier.

17. A material handling device according to claim 14 wherein said carrier bumper is pivotably mounted to one of said first and second lateral sides of said carrier.

18. A material handling device according to claim 14 wherein the automated guided vehicle includes a ramp surface for contacting said carrier bumper.

19. A material handling device according to claim 12 wherein said carrier includes at least four carrier bumpers mounted to at least a portion of a front, rear and first and second lateral sides of said carrier.

20. A material handling device according to claim 12 wherein said light source includes a first and a second light source for sending said first and said second light beams, respectively.

21. A material handling device according to claim 12 wherein said scanner includes a first and a second scanner for receiving said reflection from said first and said second light beams, respectively.

22. A material handling device according to claim 12 wherein said automated guided vehicle is configured for driving under said rear of said carrier, engaging and disengaging said carrier at a predetermined position, and driving-out from under said front of carrier.

23. A material handling device according to claim 12 wherein said automated guided vehicle is configured for driving under said carrier, engaging and disengaging said carrier at a predetermined position, and driving-out from under said one of said first and second lateral sides of said carrier.

24. A material handling device having an automated guided vehicle, configured for releasably attaching to a carrier, including a sensor, mounted on the automated guided vehicle, having a light source capable of transmitting a light beam and a scanner capable of receiving a reflection of the light beam, comprising:
   a carrier bumper, mounted to the carrier, including a carrier reflective target secured to said carrier bumper wherein the light source is directed toward the carrier reflective target;
   said carrier reflective target positioned to reflect the light beam transmitted by the light source to the scanner; and
   a controller is provided for use with the automated guided vehicle and connected to the sensor for controlling the movement of the automated guided vehicle in response to a signal from the sensor.

25. A material handling device according to claim 24 wherein said carrier reflective target being moveable in response to deflection of said carrier bumper from a non-reflective position to a reflective position when said carrier bumper is moved into the light beam transmitted by the light source thereby causing the scanner to receive the reflection of the light beam.

26. A material handling device according to claim 24 wherein said signal from the sensor is used to stop the movement of the automated guided vehicle.

27. A material handling device according to claim 24 wherein said signal from the sensor is used to position the carrier with respect to the automated guided vehicle.

28. A material handling device comprising:
   a carrier having a front, rear and first and second lateral sides;
   an automated guided vehicle configured for driving under said carrier, engaging and disengaging said carrier at a predetermined position, and driving-out from under said carrier;
   a vehicle bumper, mounted on said automated guided vehicle;
   a first sensor, mounted on the automated guided vehicle, having a light source capable of transmitting a first light beam and a scanner for receiving a reflection from said first light beam;
   a second sensor, mounted on the automated guided vehicle, capable of detecting an object in front of the automated guided vehicle;
   a carrier bumper, mounted to the carrier, including a carrier reflective target secured to said carrier bumper;
   said first light beam directed to the carrier reflector target;
   said carrier reflective target being moveable in response to deflection of said carrier bumper from a non-reflective position to a reflective position when said carrier bumper is moved toward said sensor; and
   a controller for controlling the automated guided vehicle in response to a signal from said sensor.

* * * * *